United States Patent
Gavelin et al.

(10) Patent No.: US 6,596,440 B2
(45) Date of Patent: Jul. 22, 2003

(54) POLYMER ELECTROLYTE, A BATTERY CELL COMPRISING THE ELECTROLYTE AND METHOD OF PRODUCING THE ELECTROLYTE

(75) Inventors: Patrik Gavelin, Helsingborg (SE); Bengt Wesslén, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 09/745,137

(22) Filed: Dec. 20, 2000

(65) Prior Publication Data

US 2001/0033974 A1 Oct. 25, 2001

(30) Foreign Application Priority Data

Dec. 20, 1999 (SE) ............................. 9904667

(51) Int. Cl.[7] ................................ H01M 6/18
(52) U.S. Cl. ................. 429/306; 429/308; 252/62.2
(58) Field of Search ................. 429/306, 308; 252/62.2

(56) References Cited

U.S. PATENT DOCUMENTS 5,219,681 A    6/1993   Yamada et al. ............. 429/192
5,275,750 A    1/1994   Sato et al. .................. 252/62.2
6,057,056 A *  5/2000   Kim et al. ................... 429/213
6,294,289 B1 * 9/2001   Fanta et al. ................. 429/122

FOREIGN PATENT DOCUMENTS

| EP | 0 499 115 A1 | 8/1992 |
| EP | 0 605 734 A1 | 7/1994 |
| EP | 0 893 836 A1 | 1/1999 |
| WO | 97/06207 A1 | 2/1997 |

OTHER PUBLICATIONS

PCT International–Type Search Report prepared in connection with Swedish priority application No. 9904667–4 with a mailing date of Sep. 8, 2000.

* cited by examiner

Primary Examiner—Patrick Ryan
Assistant Examiner—Dah-Wei D. Yuan
(74) Attorney, Agent, or Firm—Jenkens & Gilchrist, P.C.

(57) ABSTRACT

The invention relates to a polymer electrolyte comprising a polymer, a metal salt and at least one plasticizer or solvent, wherein the polymer is an amphiphilic graft copolymer comprising a backbone carrying hydrophilic and hydrophobic grafts attached to different carbon atoms in the backbone, and further wherein the hydrophobic grafts are selected from the group of fluorinated chains or alkyl chains having at least 8 carbon atoms. The invention also relates to a battery cell comprising a polymer electrolyte and methods of producing a polymer electrolyte.

14 Claims, No Drawings

POLYMER ELECTROLYTE, A BATTERY CELL COMPRISING THE ELECTROLYTE AND METHOD OF PRODUCING THE ELECTROLYTE

TECHNICAL FIELD OF THE INVENTION

The present invention concerns a polymer electrolyte, a battery cell comprising said polymer electrolyte and a method of producing said polymer electrolyte. The polymer electrolyte is suitable for electrochemical devices such as, batteries, particularly for secondary batteries of high energy density.

BACKGROUND OF THE INVENTION

A battery is usually composed of a number of elementary units called electrochemical cells. Each of these cells consists of a positive electrode, a negative electrode and an electrolyte solution, in which the two electrodes are immersed with or without the interposition of a separator. The most important function of the separator is to prevent electronic contact between different plates and to absorb the electrolyte. Moreover, it is also important to keep the resistance as low as possible.

By the term "battery" is meant herein, a collection of two or more cells connected together with electrically conductive material, placed in a case.

There are two main types of batteries, primary batteries and secondary batteries; however in the following, only secondary batteries will be considered. Secondary batteries can be charged by a source of electrical energy, from which batteries the energy can be recovered. Secondary batteries are also called accumulators, or rechargeable batteries. The latter term will be used in the following.

Rechargeable batteries are often used as power supply in portable communication equipment, such as cellular phones, personal pagers, portable computers and other electrical devices, such as smart cards, calculators etc.

In a rechargeable battery, ions of a source electrode material move between electrodes through an intermediate electrolyte during the charge and discharge cycles of the cells. During discharge, the electricity-producing reactions cause reversible changes in the composition of die electrodes and the electrolyte. During charging, these changes can be reversed to the original conditions. The electrochemical reactions take place both at the negative electrode (which is the anode in the discharging mode and the cathode in the charging mode) and at the positive electrode of the electrochemical cell.

Research and development are now being made on lightweight and high-voltage secondary batteries having improved design flexibility. The main battery characteristics to be improved by new research are size, weight, energy density, lower discharge rates, cost, environmental safety and working life. Lithium metal secondary batteries are promising power sources because of their high energy density. In general, such a lithium battery employs lithium metal as its negative electrode and an organic solution containing a lithium salt as its electrolyte. Dendrites (crystals with tree-like branches) are commonly generated on the lithium metal surface during repeated charge and discharge cycles when lithium metal is used as negative electrode in a lithium secondary battery, which results in a short circuit within the battery.

Most attention has now been focused on lithium ion secondary batteries using a negative electrode comprising a carbon material being a host for inserted lithium ions. These systems utilize an intercalation and de-intercalation reaction of the lithium ions in the host. The lithium ion secondary batteries generally have a lower theoretical negative electrode capacity than the lithium metal secondary battery, but is superior in cycle characteristic and system reliability. Frequently, lithium ion secondary battery cells employ organic electrolytic solutions as their electrolytes. However, the use of an organic liquid electrolyte imposes problems associated with the reliability of the battery system, e.g. leakage of the electrolyte out of the battery, vaporization of the solvent of the electrolyte, and dissolution of electrode material in the electrolytic solution. Since the electrolyte contains a flammable organic solvent the leakage of the solvent may result in ignition. While better manufacturing techniques have decreased the occurrences of leakage, lithium ion secondary battery cells still can leak potentially dangerous electrolytes. Battery cells using liquid electrolytes are also not available for all designs and do not have sufficient flexibility.

Conversely, solid polymer electrolytes are free from problems of leakage. They have, however, inferior properties as compared to liquid electrolytes. For example, conventional solid polymer electrolytes have ionic conductivities in the range of $10^{-6}$ to $10^{-4}$ S/cm at ambient temperature whereas acceptable ionic conductivities are $>10^{-3}$ S/cm. High ionic conductivity is necessary to ensure a battery system capable of delivering usable amounts of power for a given application. It is also necessary for the high rate operation demanded by, for example, mobile phones. Accordingly, present solid polymer electrolytes are not adequate for many high performance battery systems. By "solid" polymer electrolyte is meant a polymer electrolyte without any solvent or plasticizer, while a polymer "gel" electrolyte comprises a solvent or a plasticizer, in this application. When using the term "polymer electrolyte" both solid and gel electrolyte are included.

While solid polymer electrolytes are intended to replace the combination of liquid electrolytes and separators used in conventional batteries, the limitations described here have prevented them from being fully implemented. One class of polymer electrolytes, namely polymer gel electrolytes, have shown some promises. There is however a disadvantage with a poor compatibility with the anode. The reason for poor compatibility is the building up of a passivating layer on the surface of the anode.

Polymer gel electrolytes are formed by tapping an electrolyte, i.e., an organic solvent mixture containing dissolved lithium salt, in a polymer matrix. Such a polymer matrix consists of, for example, poly(acrylontrile) (PAN), poly(methyl methacrylate) (PMMA), a copolymer of poly (vinylidene fluoride) (PVdF) and hexafluoropropene (HFP) (Kynarflex®). The immobilization procedure varies from case to case and includes UV crosslinking, casting and gelation. There is no molecular interaction between these polymers and the electrolyte and the electrolyte solution, and the polymer gel electrolyte can be considered as a two-phase system.

Polymer gel electrolytes have promising properties in terms of conductivity and electrochemical stability (wide operational voltage window). In principle, these properties make the polymer gel electrolytes suitable for use in different types of high-energy lithium batteries. Many of the polymer gel electrolytes can be considered as basically two-phase materials where the polymer is a passive component acting as a rigid matrix incorporating regions of electrolyte. These is two-phase materials do not offer sufficient long-term stability due to phase separation. Another disadvantage of conventional polymer gel electrolyte is that the reliability of the battery cells is low due to their poor chemical compatibility with the electrodes. The reason for the poor compatibility is the build-up of passivation films, mainly at the interface between the negative electrode and the polymer gel electrolyte, because of the high content of organic solvent. The passivation film consists of a primary inorganic layer and a second layer of organic nature. The second layer is probably not evenly distributed over the electrode surface, and areas with varying thickness are present This second layer increases in thickness with cycling of the battery cell, and this increase is regarded as the main problem when using polymer gel electrolytes in secondary lithium polymer batteries due to the concurrent loss of capacity. Approaches to reduce the problem, by addition of inorganic and organic additives, or replacing the reactive organic solvents with less reactive ones, have not been successful.

U.S. Pat. No. 5,587,253 discloses a lithium ion battery with an electrolyte/separator composition comprising a vinylidene fluoride copolymer and a plasticizer. The crystalline structure of the vinylidene fluoride copolymer necessitates the introduction of plasticizers to disrupt the crystalline regions of the copolymer matrix simulating an amorphous region that leads to higher ionic conductivity. In addition, the introduction of plasticizer reduces the glass transition temperature of the polymer, allowing it to undergo melt flow or softening during the operation of the battery.

U.S. Pat. No. 5,407,593 teaches that the main path for ion transport in a polymer electrolyte is via the amorphous regions of a polymer matrix. Thus, decreasing the volume fraction of the crystalline regions and increasing the amorphous regions of the polymer matrix may increase the ionic conductivity of a polymeric electrolyte. The methods frequently used to achieve this are: (1) preparing a new polymer such as a copolymer or polymer with a network structure; (2) adding non-soluble additives to improve the electrolytic property; and (3) adding soluble additives to provide a new path for ionic conductivity. Polymers having high dielectric constants are good matrices for preparing polymeric electrolytes, However, because they have high glass transition temperatures or high degrees of crystallinity, they do not give desirable polymeric electrolytes. To remedy this, this document discloses a polymeric electrolyte containing no volatile components. This assures that no change in conductivity and composition occurs due to the volatilisation of some compounds contained therein. Thus, the conductivity is kept constants. The polymeric electrolytes disclosed in the document include a polar polymer matrix, a dissociable salt, and a plasticizer of polyether or polyester oligomers having terminal halogenated groups.

U.S. Pat. No. 5,776,796 describes a battery having a polymer electrolyte, an anode and a cathode which are passivation free. The anode consists of $Li_4T_5O_{12}$. The electrolyte comprises a polymer host such as poly(acrylonitrile), poly(vinyl chloride), poly(vinyl sulphone) and poly (vinylidene fluoride), plasticized by a solution of a Li salt in an organic solvent. The cathode includes $LiMn_2O_4$, $LiCoO_2$, $LiNiO_2$ and $LiV_2O_5$, and derivatives thereof. The decrease of the passivating layer is achieved by the choice of the electrode and the electrolyte material. The passivating film in the lithium battery utilising poly(acrylonitrile) based electrolytes could be eliminated by using an electrode which intercalated Li at a potential higher than 1 V versus Li+/Li. It is the choice of the anode material in combination with a poly(acrylonitrile) based electrolyte which provides the passivation free surface.

WO-A1-9706207 describes a polymer gel electrolyte that can be produced as a thin film. The polymer electrolyte is made by polymerising a thin layer of a solution containing three monomers, an electrolyte salt and a plasticizer. One of the monomers is a compound having two acryloyl functionalities, another is a compound having one acryloyl or allyl functionality and also contains groups having high polarity such as a carbonate or a cyano group. Another selected monomer is a compound having one acryloyl functionality and an oligo(oxyethylene)group ($-CH_2CH_2-O$). Polymerisation results in an electrolyte film.

By the present invention the problem with passivation phenomena at the electrode surfaces is decreased and the active function of all amphiphilic graft copolymer results in a one phase system and a significantly higher ionic conductivity, as compared to present polymer electrolytes.

SUMMARY OF THE INVENTION

The present invention concerns a polymer electrolyte comprising a polymer, a metal salt and possibly at least one plasticizer or solvent, wherein the polymer is an amphiphilic graft copolymer comprising a backbone carrying hydrophilic and hydrophobic grafts. The hydrophobic grafts are selected from the group of fluorinated chains of allyl chains containing at least 8 carbon atoms. The plasticizer or solvent is a high-boiling organic solvent. The polymer electrolyte has superior ionic conductivity and chemical stability towards the electrodes, as compared to present polymer electrolytes. In this application, the term polymer electrolyte comprises both a gel electrolyte which contains a solvent or plasticizer and a solid electrolyte which does not contain any solvent or plasticizer.

The polymer comprised in die electrolyte of the invention is an amphiphilic graft copolymer, which is a copolymer comprising a backbone carrying hydrophilic and hydrophobic sidechains or grafts attached to different carbon atoms in the backbone. Note that the sidechains are sometimes termed grafts in is context. Regarding a polymer gel electrolyte, this copolymer functions as an active polymer matrix, in contrast to the polymers commonly used in conventional polymer gel electrolytes, which are regarded as passive. The hydrophilic grafts of the amphiphilic graft copolymer of the invention are solubilized by the electrolyte solution and co-ordinates weakly to the cations. This ensures a high solubility of the copolymer, and that the polymer gel electrolyte will not phase separate at a macroscopic level in battery operation.

When a solid polymer electrolyte is concerned, the copolymer also functions as an active polymer matrix, not only in the coordination of cations, as for conventional solid polymer electrolytes, but also by attracting anions and improving the ion dissociation of the salt in the solid polymer electrolyte. The hydrophilic grafts of the amphiphilic graft copolymer of the invention solubilize the salt by the co-ordination of the cations. This ensures a nigh solubility of die lithium salt in the solid polymer electrolyte.

Referring to the polymer electrolyte according to the invention, the hydrophobic grafts of the amphiphilic graft copolymer of the invention may solubilize lipophilic anions of for example a lithium salt, which, together with weak cation co-ordination properties of the hydrophilic segments, will improve the salt dissociation and lithium ion transport number. As a result a higher ionic conductivity is obtained for the polymer electrolyte of the invention, as compared to the commonly used polymer electrolytes disclosed elsewhere.

The invention also concerns a polymer battery cell comprising a cathode, an anode, and a polymer electrolyte comprising a metal salt, a polymer and possibly at least one plasticizer or solvent, wherein the polymer is an amphiphilic graft copolymer comprising a backbone carrying hydrophilic and hydrophobic grafts.

Further, the invention relates to a method of producing said polymer electrolyte.

The present invention will solve the problems with ion conductivity, phase separation of an electrolyte, passivating films on electrodes and give batteries with longer product lifes.

DETAILED DESCRIPTION OF THE INVENTION

The present invention concerns a polymer electrolyte comprising a polymer, a metal salt and possibly at least one plasticizer or solvent wherein the polymer is an amphiphilic graft copolymer comprising a backbone carrying hydrophilic and hydrophobic grafts attached to different carbon atoms in the backbone, wherein the hydrophobic grafts are selected from the group of fluorinated chains or alkyl chains containing at least 8 carbon atoms. These chains show strong hydrophobicity which give the necessary properties to the polymer. The hydrophobic grafts and the hydrophilic grafts are situated in different monomer units in the polymer.

The polymer electrolyte of the present invention is unique in the sense that the strongly hydrophobic segments characteristic of the graft copolymer have a stimulating effect on the ion-conductive process. By structural design of an amphiphilic graft copolymer it is possible to attain a polymer electrolyte that is active in the solvation of the electrolyte salt, and in the coordination of ionic species in competition with the solvent, if a solvent is present. The amphiphilic polymer is also oriented in a way which is advantageous for preventing passivating films in battery cells.

In addition to an improved conductivity when using the polymer electrolyte concept of the present invention, an improved compatibility towards die electrode surfaces can be addressed by the amphiphilic graft copolymer in, the electrolyte. It is commonly believed that anionic species can form oligomers on the electrode surfaces and these organic species are not evenly distributed on the electrode surfaces, but are thought to form domains of varying thickness. These domains are commonly regarded as parts of the second passivation layer formed during cycling of the lithium polymer battery. Reducing the growth of these oligomers means reducing passivation films and this will result in improved battery performance when the electrolyte is applied in a lithium polymer battery. The amphiphilic nature of the copolymer, having strong hydrophobic and hydrophilic grafts, results in a self-organizing effect of the grafts in the electrolyte reducing the passivation phenomena at the electrode surfaces.

The amphiphilic graft copolymer of the invention comprises a main-chain (backbone) carrying hydrophilic (polar) side-chains as well as hydrophobic (nonpolar) side-chains (grafts), wherein the hydrophobic grafts are selected from the group of fluorinated chains or alkyl chains containing at least 8 carbon atoms. The hydrophobic grafts could also be selected among olefins carrying methyl groups, olefins carrying siloxanes and olefins crying aromatic groups. The backbone in the polymer is a polyacrylate or polymethacrylate. The hydrophilic segments preferably consist of oligo(ethylene oxide) chains, but other hydrophilic chains may be used, such as, for example oligo(propylene oxide) chains. According to a preferred embodiment the hydrophobic segments comprise fluorinated alkyl chains, fluorinated aryl chains or alkyl groups having at least 8 carbon atom, most preferred fluorinated alkyl chains. A preferred amphiphilic graft copolymer used for preparation of the polymer electrolyte has the following structure:

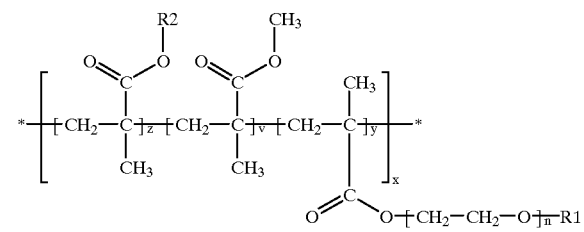

wherein:

z, y and v refer to the composition given as weight percent of the total weight of the polymer, the value of z may vary from 5 to 90 weight percent, y is in the range of 5 to 95 weight percent, and v is in the range of 0 to 90 weight percent;

n is an integer with a value in the range of 5 to 35, and

R1 is selected from the group consisting of an alkyl group, preferably $C_{1-5}$ alkyl.

R2 is selected from the group consisting of a fluorinated $C_{1-20}$ alkyl.

Preferably the value of z may vary from 10 to 80 weight percent, y is in the range of 10 to 90 weight percent, and v is in the range of 0 to 50 weight percent. R2 is preferably selected from a fluorinated $C_{1-10}$ alkyl.

z, y and v may vary as has been described above. The content of the oligo(ethylene oxide) is important. n, which is the integer for the repeating number of oligo(ethylene oxide) may vary between 5 and 35. If n is large, then y can have a small value in the interval, as well as if n is small, y can have a large value. However, it is the balance between the hydrophilic parts and the hydrophobic parts in die copolymer that is important for the ion conductivity. For example, if n=2 and v=0, then y should not be less than 40 wt % and z not less than 15 wt %, if n=9 and v=0, then y should not be less than 15 wt % and z not less than 10 wt % and if n=23 and v=0, then y should not be less than 11 wt % and z not less than 10 wt %.

The salt used in the polymer electrolyte is preferably a lithium salt.

When a polymer gel electrolyte is concerned, the polymer electrolyte comprises a polymer, a metal salt and at least one plasticizer or solvent, wherein the polymer is an amphiphilic graft copolymer comprising a backbone carrying hydrophilic and hydrophobic grafts attached to different carbon atoms in the backbone. In order to give the polymer the strong hydrophobicity, the hydrophobic groups are selected from fluorinated chains or alkyl chains having at least 8 carbon atoms.

In conventional polymer gel electrolytes, the ionic conductivity is attributed to the transport of cations and anions in the liquid component of the polymer gel electrolyte. The microscopic viscosity of the polymer gel electrolyte is the main limiting factor for the ionic conductivity in the polymer gel electrolyte. In polymer gel electrolytes, a strong coordination between the polymer and the cation similar to that commonly encountered in solid polymer electrolytes will not be favorable, because the ion transport process inherent to the polymer chains is slower than that in the liquid component of the electrolyte due to slow segmental motions. Consequently, short poly(ethylene oxide) grafts, i.e. hydrophilic grafts, connected to the polymer backbone are more favorable from the conduction point of view because of a weaker coordination to the cation of the salt as compared to long poly(ethylene oxide) grafts. In addition, long poly(ethylene oxide) grafts, such as, for example those having a molecular weight of 2000, will aggregate and crystallize which will inflict negatively on the ion conductivity. The strong polar nature of the poly(ethylene oxide) side chains ensures that the gel electrolyte of the invention will be homogeneous and form a stable one phase system. By having the hydrophilic grafts and the hydrophobic grafts attached to different carbon atoms an increased mobility is achieved, which is advantageous in both the gel electrolyte and the solid electrolyte.

Because of the incorporation of strongly hydrophobic segments, selected from the groups mentioned above, into the graft copolymer used in die polymer gel electrolyte of the invention, an increased amphiphilic nacre of the graft copolymer results, which stimulates an increased ionic conductivity in the polymer gel electrolyte formed from the polymer. The strongly hydrophobic groups of the copolymer are preferably fluorinated alkyl chains, fluorinated aryl chains or aryl chains having at least 8 carbon atoms. The amphiphilic character of the graft copolymers induces self-organisation at the electrode surfaces. The nature of the electrode surfaces will determine the type of organisation. The amphiphilic graft copolymers will interact advantageously with the solvent or plasticizer at the electrode surfaces, which results in a decrease of growth of die passivation film with an improved capacity for the whole battery system as a result.

The fact that amphiphilic graft copolymers of the type and compositions disclosed in the present invention can have an active role and facilitate the ionic transport processes in a polymer gel electrolyte is a flew finding.

When a solid polymer electrolyte is concerned, the polymer electrolyte comprises a polymer, and a metal salt, wherein the polymer is an amphiphilic graft copolymer comprising a backbone carrying hydrophilic and hydrophobic grafts attached to different carbon atoms in the backbone. As in the case with gel electrolyte, the hydrophobic groups are selected from fluorinated chains or alkyl chains having at least 8 carbon atoms. The solid polymer electrolyte does not contain any plasticizer or solvent.

Generally, as noted in numerous publications in the last decade, poly(ethylene oxide) segments easily coordinate to lithium cations and this co-ordination is the reason for the ion conduction process in solid polymer electrolytes. In conventional polymer gel electrolytes, the ionic conductivity is attributed to the transport of cations and anions in the liquid component of the polymer gel electrolyte. In solid polymer electrolytes, the polymer need to include a sufficiently hydrophilic content in order to solubilize the metal salt, responsible for the ion conduction.

In certain battery applications, as for example in electric vehicles, the necessity for safe and highly reliable systems make the presence of volatile components impossible. Therefore, the use of solid polymer electrolytes is in favor of polymer gel electrolytes that contains volatile plasticizers, despite their somewhat lower ionic conductivity.

Because of the incorporation of strongly hydrophobic segments into the graft copolymer used in the solid polymer electrolyte of the invention, an increased amphiphilic nature of the graft copolymer results, which stimulates au increased ionic conductivity in the solid polymer electrolyte formed from the polymer. By structural design of an amphiphilic graft copolymer it is possible to attain a solid polymer electrolyte that is active in the solvation of the electrolyte salt. The strongly hydrophobic groups of the copolymer are preferably fluorinated alkyl chains, fluorinated aryl chains or alkyl chains having at least 8 carbon atoms.

The fact that amphiphilic graft copolymers of the type and compositions disclosed in the present invention can have an active role in the sense of increasing the ion dissociation of the metal salt, which results in a facilitated ion transport process in the solid polymer electrolyte, is a new finding.

The polymer electrolyte may also be crosslinked.

The invention also concerns a polymer battery cell comprising a cathode, an anode and a polymer electrolyte comprising a metal salt a polymer and possibly at least one plasticizer or solvent, wherein the polymer is an amphiphilic graft copolymer comprising a backbone carrying hydrophilic and hydrophobic grafts attached to different carbon atoms in the backbone, wherein the hydrophobic grafts are selected from the group of fluorinated chains or alkyl chains having at least 8 carbon atoms. Further examples are olefins carrying methyl groups, olefins carrying siloxanes and olefins carrying aromatic groups.

The polymer used in die electrolyte in the battery cell according to the polymer described above and the electrolyte may be a solid polymer electrolyte or a polymer gel electrolyte as described above. A battery using the cells according to the invention comprising the amphiphilic copolymer will have a good ionic conductivity, and the problem with passivation films will be reduced and thereby will a battery comprising the cells according to the invention have a prolonged product life, since the formation of passivation films will be limited.

The metal salt used in the electrolyte according to die battery cell is preferably a lithium salt.

The graft copolymer used in the polymer electrolyte, according to the invention, may be synthesized by free-radical copolymerization techniques, using a combination of monomers and macromonomers. The monomers and macromonomers used preferably contain an acryl or methacryl functionality, which when polymerized fort a polyacrylate or polymethacrylate backbone. Other polymerization techniques may be used, and the present invention is not limited to the use of polymerization method presented in this text.

Additionally, an object with the invention is a method of producing a polymer electrolyte according to above, wherein an anhydrous salt is dissolved in at least one first anhydrous solvent or plasticizer forming a first solution and that an amphiphilic graft copolymer comprising a backbone carrying hydrophilic and hydrophobic grafts attached to different carbon atoms in the backbone, wherein the hydrophobic grafts are selected from the groups of flourinated chains or alkyl chains, having at least 8 carbon atoms is either 1) dissolved in the first solution forming a polymer gel electrolyte, or
2) dissolved in at least one second solvent or plasticizer forming a second solution which is mixed with the first solution, where after the solvent is slowly evaporated, forming a solid polymer electrolyte.

It is important to first produce the amphiphilic graft copolymer according to the present invention and then form the polymer electrolyte. In this way a more preferable morphology can be achieved, which is important for the compatibility with the electrodes and the ion conductivity in the system. By using this method the molecular weight can be controlled, together with the composition and conformation of the graft copolymer. The purity of the polymer will also be much higher ensuring that no reactive monomers will remain in the polymer electrolyte, as compared to when polymerizing directly in the liquid component of the electrolyte.

When producing a polymer gel electrolyte, an anhydrous salt is dissolved in at least one first anhydrous solvent or plasticizer forming a first solution and then an amphiphilic graft copolymer comprising a backbone carrying hydrophilic and hydrophobic grafts attached to different carbon atoms in the backbone is dissolved in the first solution forming a polymer gel electrolyte. The graft copolymer was dissolved in the solution comprising the salt for a period of time until the polymer gel electrolyte was completely homogenous.

When producing a solid polymer electrolyte, an anhydrous salt is dissolved in at least one first anhydrous solvent or plasticizer forming a first solution and then an amphiphilic graft copolymer comprising a backbone caring hydrophilic and hydrophobic grafts attached to different carbon atoms in the backbone is dissolved in at least one second solvent or plasticizer forming a second solution which is mixed with die first solution, where after the solvent is slowly evaporated, forming a solid polymer electrolytes. That is, the anhydrous salt and the graft copolymer were dissolved separately in at least one anhydrous solvent, forming homogenous mixtures. The two mixtures where then blended. The solvent in the mixture containing polymer, solvent and salt was allowed to evaporate slowly. When a preferable viscosity could be detected, the polymer electrolyte solution was solvent cast on a plate. The solvent was allowed to evaporate slowly which resulted in a solid polymer electrolyte film.

The polymer electrolytes may be applied in any conventional way, where the polymer is first prepared and then an electrolyte is produced.

Many different salts and mixtures of salts can be used for preparation of the polymer electrolyte of the present invention, i.e., both the solid and the gel is polymer electrolyte. As preferred examples are given salts of Lewis acid complexes such as $LiAsF_6$, $LiPF_6$, $LiBF_4$ and $LiSbF_6$; and sulfonic acid salts, such as $LiCF_3SO_3$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)_2$, $LiB(CF_3SO_2)_2$ and $LiO(CF_3SO_2)$. The choice of salts for the preparation of the polymer gel electrolyte is not limited to the examples given above. Other conceivable salt types include $LiClO_4$, $LiCF_3CO_3$, $NaClO_3$, $NaBF_4$, $NaSCN$, $KBF_4$, $Mg(ClO_4)_2$ and $MgBF_4)_2$, as well as any salt being used in conventional electrolytes can be employed. As noted previously, the various salts exemplified above may be used in combination The salt preferably used are a lithium salt selected from a group consisting of $LiPF_6$, $LiAsF_6$, $LiBF_4$, $LiClO_4$, $LiN(CF_3SO_2)_2$, and lithium salts of the perfluorosulfonate family such as $LiSO_3CF_3$, $LiSO_3(CF_2)_3CF_3$ and $LiSO_3(CF_2)_9CH_3$.

A polymer gel electrolyte contains, in addition to the polymer and the salt, a solvent or plasticizer, which is responsible for electrolytic transport properties of the gel. Many combinations of solvents and salts are possible to use for the polymer gel electrolyte of the invention. These solvents may also be used when producing either a polymer gel electrolyte or a solid polymer electrolyte.

Solvents used for preparation of the polymer electrolyte of the invention and comprised in the polymer gel electrolyte of the invention include ethylene carbonate (EC), propylene carbonate (PC), diethyl carbonate, dimethyl carbonate, methylethyl carbonate, g-butyrolactone g-butylene carbonate, tetrahydrofuran, 2-methyltetrahydrofuran dimethyl sulfoxide, 1,2-dimethoxyethane, 1,2-ethoxymethoxyethane, dioxylane, sulfolane, methyl glyme, methyl triglyme, methyl tetraglyine, ethyl glyme, ethyl diglyme, butyl diglyme and etherified oligomers of ethylene oxide, and mixtures of said solvents. Other solvents of choice include modified carbonates, and substituted cyclic and non-cyclic esters, preferable methyl-2,2,2-trifluoroethyl carbonate, di(2,2,2-trifluoroethyl) carbonate and methyl-2,2,3,3,3-pentafluoropropyl carbonate The polymer electrolyte disclosed in the present invention is preferably used as electrolyte in batteries, condensers, sensors, electrochromic devices, and semiconductor devices and the invention also refers to use of the polymer electrolyte according to above as electrolyte in batteries, condensers, sensors, electrochromic devices, and semiconductor devices. The solid polymer electrolyte is for example used in batteries in electric vehicles. In general, a battery consists of an anode, prepared from an active, positive electrode material, an electrolyte, and a cathode prepared from an active, negative electrode material. Often it can be advantageous to use a mechanical separator between the anode and the cathode, to prevent accidental contacts between the electrodes, leading to short-circuit. When the polymer gel electrolyte of the invention is crosslinked and applied in a battery, the polymer gel electrolyte itself can function as the mechanical separator in the battery cell. Though the polymer gel electrolyte of the invention can be used as a membrane in a battery cell, it may be used crosslinked or either not crosslinked, after filler is dispersed therein or after it is combined with a porous separator to prepare a mechanically stable composite. Examples of the separators include glass fiber filters; nonwoven fabric filters made of fibers of polymers such as polyester, Teflon, Polyflon, polypropylene and polyethylene; and other nonwoven fabric filters made of mixtures of glass fibers and the above polymeric fibers.

The mechanical properties of the polymer electrolyte of the present invention can be improved by introducing crosslinks in the polymer structure, by, for example, thermally or radiation induced radical polymerization. Polymerizable reactive groups can be introduced into the polymer structure by reactions carried out during or after the synthesis of the amphiphilic polymer. An example of a synthesis procedure for introducing reactive groups is, in a fast step, the use of glycol methacrylate as a comonomer during polymerization of the amphiphilic graft copolymer. In a second step, an allyl group is coupled to the copolymer by the reaction of allylchlorodimethylsilane with the hydroxyl site in the copolymer. The resulting copolymer may then be cured in the electrolyte solution using u.v. radiation and, for example, benzophenone as a photo initiator. Curing can also be performed using a solvent carrier whereby the solvent is removed before introducing the electrolyte solution. There is no specific limitation on the chemical compound that can be applied in the invention for introducing crosslinks, and any compound capable of undergoing chemical reaction such as thermal polymerization or active light polymerization (photo-polymerization) to produce crosslinks can be employed.

Commonly, formation of a polymer electrolyte membrane is performed by using monomers having different functionality which can be polymerized and crosslinked at the same time forming a stable polymer network in the electrolyte.

However, this type of preparation method of a copolymer and an electrolyte does not give a well-defined polymer structure and the polymer structure can not be optimized for a given function, when applied in, for example, a battery. Using a pre-polymer well defied in the structure and crosslinking performed in the electrolyte, as a second step, gives the opportunity to functionalize the polymer towards a given purpose when applied as a polymer gel electrolyte, as shown by the present invention.

Examples of the positive electrode materials used for the battery cell of the invention include transition metal oxides, such as $V_2O_5$, $MnO_2$ and $CoO_2$; transition metal sulfide, such as $TiS_2$, $MoS_2$ and $Co_2S_5$; transition metal chalcogen compounds; and complex compounds of these metal compounds and Li (i.e. Li complex oxides), such as $LiMnO_2$, $LiMn_2O_4$, $LiCoO_2$, $LiNiO_2$, $LiCo_xNi_{1-x}O_2$ (0<x<1), $LiMn_{2-a}X_aO_4$ and $LiMn_{2-a-b}X_aY_bO_4$(0<a<2, 0<b<2, 0<a+b<2). Examples of electroconductive materials include one-dimensional graphitization products (thermal polymerization products of organic materials); fluorocarbons; graphites; and electroconductive polymers having an electrical conductivity of not less than $10^{-2}$ S/cm, such as polyaniline, polyimide, polypyrrole, polypyridine, polyphenylene, polyacetylene, polyazulene, polyphthalocyamine, poly-3-methylthiophene, and polydiphenylbenzidine, and derivatives of these conductive polymers.

Examples of negative electrode active materials used for the battery cell of the invention include metallic materials, such as lithium, lithium-aluminium alloy, lithium-tin alloy and lithium-magnesium alloy; carbons (including graphite type and non-graphite type); carbon-boron substituted substances (BC2N); and intercalation materials capable of occluding lithium ion, such as fin oxide. Particular examples of the carbons include calcined graphites calcined pitch, calcined coke, calcined synthetic polymer and calcined natural polymers. Examples of positive current collectors for use in the invention include metal sheets, metal foils, metal nets, punching metals, expanded metals, metal plated fibers, metallized wires, and nets or nonwoven fabrics made of metal containing synthetic fibers. Examples of metals used for these positive current collectors include stainless steel, gold, platinum, nickel, aluminum, molybdenum and titanium.

The battery cell according to the invention will give a better ion conductivity and a battery with a more stable electrolyte. The passivation phenomena will be prevented which will give a battery a longer product life. The amount plasticizer or solvent may be decreased in the polymer gel electrolyte according to the invention, compared to conventional polymer gel electrolytes, which is a an advantage from the view of safety because the plasticizers are volatile components. The reason for a decrease in the amount plasticizer is because of the higher conductivity in the polymer gel electrolyte according to the invention and that the ethylene oxide chains have a plasticizing effect. The polymer used in the polymer gel electrolyte according to the invention may also be used as a binder or a separator in a battery.

The invention also concerns die use of a battery cell in a mobile communication device, such as a cellular phone, personal pager, and portable computer.

The invention will now be described in more detail with reference to die following examples.

The graft copolymers used in the examples were synthesized by radical copolymerisation techniques using monomers and macromonomers. The grafts are always situated on different monomers units, which improves the effect of the copolymer. The polymerization process was initiated with a radical initiator, carried out at a constant temperature, and subjected to $N_2$ to ensure an oxygen free environment. After the synthesis the reaction mixture was filtrated to remove gel particles before removing residual monomers. The graft copolymers were characterized with respect to structure by $^1H$ NMR.

Preparation Example of Polymer for Example 1 to 3

The graft copolymers were synthesized by radical polymerisation techniques using a macromonomer together with comonomers. The graft copolymers were synthesized using Azobisisobutyronitrile (AIBN) as a radical initiator. To a three-necked flask, equipped with a stirrer, 3.3 g of poly (ethylene glycol) (Mn=400) monomethyl ether methacrylate, 1.1 g of methyl methacrylate, and 6.5 g of 1H,1H,7H-dodecafluoroheptyl methacrylate were added to 100 ml of toluene. After the reaction mixture had been subjected to $N_2$ to ensure oxygen free environment, 0.13 g of AIBN was added to the three-necked flask. The radical copolymerisations were carried out at a temperature of 60° C. under $N_2$ for a time of around 15 h. After the synthesis the reaction mixture was filtrated to remove gel particles before removing residual monomers. The graft copolymers were first precipitated in n-hexane to remove the fluoroalkyl monomer, and after drying, the precipitates were dissolved in tetrahydrofuran (THF). The second precipitation was carried out in methanol, and after drying, the precipitates were successively leached with distilled water to remove PEO macromonomers. Finally, the purity of the graft copolymers was checked with GPC by following the disappearance of PEO macromonomers.

From NMR analysis it was shown that the synthesized amphiphilic graft copolymer, used in the examples 1 to 3, consisted of 32 percent by weight of poly(ethylene glycol) (Mn=400) monomethyl ether methacrylate, 10 percent by weight of methyl methacrylate and 58 percent by weight of 1H,1H,7H-dodecafluoroheptyl methacrylate. That is y=3, v=10 and z=58, and n=9. A structure of the polymer achieved is as follows:

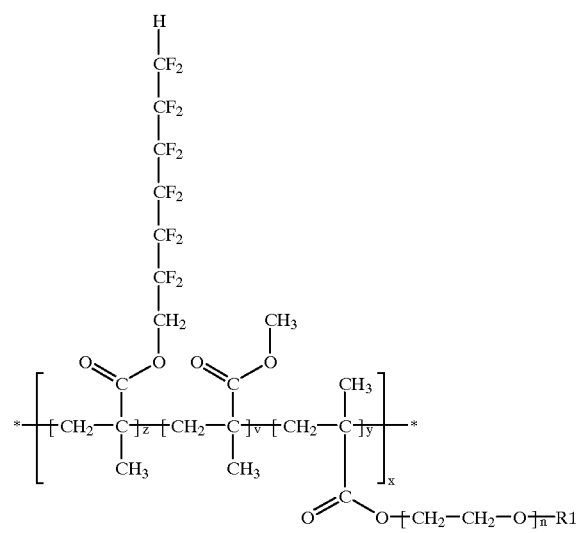

wherein $R1=CH_3$.

Preparation of Polymer for Example 4

The graft copolymers were synthesized by radical polymerisation techniques using a macromonomer together with comonomers. The graft copolymers were synthesized using Azobisisobutyronitrile (AIBN) as a radical initiator. To a three-necked flask, equipped with a stirrer, 2.5 g of poly(ethylene glycol) (Mn=400) monomethyl ether methacrylate, and 8.4 g of 1H,1H,7H-dodecafluoroheptyl methacrylate were added to 100 ml of toluene. After the reaction mixture had been subjected to $N_2$ to ensure oxygen free environment, 0.13 g of AIBN was added to die three-necked flask. The radical copolymerisations were carried out at a temperature of 60° C. under $N_2$ for a time of around 15 h. After the synthesis the reaction mixture was filtrated to remove gel particles before removing residual monomers. The graft copolymers were first precipitated in n-hexane to remove the fluoroalkyl monomer, and after drying, the precipitates were dissolved in tetrahydrofuran (THF). The second precipitation was carried out in methanol, and after drying, the precipitates were successively leached with distilled water to remove PEO macromonomers. Finally, the purity of the graft copolymers was checked with GPC by following the disappearance of PEO macromonomers.

From NMR analysis it was shown that die synthesized amphiphilic graft copolymer, used in the examples 4, consisted of 24 percent by weight of poly(ethylene glycol) (Mn=400) monomethyl ether methacrylate, and 76 percent by weight of 1H-1H,7H-dodecafluoroheptyl methacrylate. That is y=24, v=0 and z=76, and n=9, R1=$CH_3$ and R2=$CH_2(CF_2)_6H$.

Ion Conductivity Measurements

The conductivity of the polymer gel electrolyte samples were measured at different temperatures in a given frequency range by placing the given samples between two gold-plated stainless steel electrodes together with spacers with defined thickness using the AC impedance method of electrochemical impedance spectroscopy (EIS).

Example of Polymer Gel Electrolytes

Example 1

In an anhydrous mixture of ethylene carbonate and λ-butyro lactone (2:1, by weight) $LiPF_6$ was dissolved in a concentration of 1.0 mole per liter of the solvent. In this electrolyte solution the amphiphilic graft copolymer was dissolved in an amount of 30 percent by weight to give a homogenous polymer gel electrolyte. The polymer gel electrolyte was introduced into the ionic conductivity-measuring cell. The ionic conductivity of the sample was measured to 2.5 mS/cm at 20° C., and 3.2 mS/cm at 30° C.

Comparative Example 1

In the same electrolyte solution as in example 1, 30 weight percent of poly(methyl methacrylate) was dissolved. The resulting gel had an ionic conductivity of 1.2 mS/cm at 20° C. and 1.7 mS/cm at 30° C.

Example 2

In an anhydrous mixture of γ-butyro lactone was $LiPF_6$ dissolved to give a solution containing 1.0 mole per liter. In this electrolyte solution the amphiphilic graft copolymer was dissolved in an amount of 30 percent by weight to give a homogenous polymer gel electrolyte. The polymer gel electrolyte was introduced into the ionic conductivity-measuring cell. The ionic conductivity of the sample was measured to 4.0 mS/cm at 20° C. and 1.0 mS/cm at −20° C.

Comparative Example 2

In the same electrolyte solution as in example 2, 30 weight percent of poly(methyl methacrylate) was dissolved. The resulting gel had an ionic conductivity of 15 mS/cm at 20° C. and 0.3 mS/cm at −20° C.

Example 3

In an anhydrous mixture of γ-butyro lactone LiN$(CF_3SO_2)_2$ was dissolved to give a concentration of 1.0 mole per liter. In the electrolyte solution the amphiphilic graft copolymer was dissolved in an amount of 30 percent by weight to give a homogenous polymer gel electrolyte. The polymer gel electrolyte was introduced into the ionic conductivity-measuring cel. The ionic conductivity of the sample was recorded to 2.5 mS/cm at 25° C.

The results are collected in Table 1 and 2

TABLE 1

| Ex. | Z | Y | V | n | Electrolyte solution | % weight of electrolyte solution | Conductivity mS/cm | Conductivity mS/cm |
|---|---|---|---|---|---|---|---|---|
| 1 | 58 | 32 | 10 | 9 | $LiPF_6$ in ethylene carbonate and γ-butyro lactone (2:1 by weight) | 70 | 2.5 (20° C.) | 3.2 (30° C.) |
| 2 | 58 | 32 | 10 | 9 | $LiPF_6$ in γ-butyro lactone | 70 | 4.0 (20° C.) | 1.0 (−20° C.) |
| 3 | 58 | 32 | 10 | 9 | $LiN(CF_3SO_2)$ in γ-butyro lactone | 70 | 2.5 (25° C.) | |
| 4 | 76 | 24 | 0 | 9 | $LiPF_6$ in γ-butyro lactone | 70 | 4.0 (20° C.) | 1.1 (−20° C.) |
| Comp. Ex. 4 | 61 | 39 | 0 | 2 | $LiPF_6$ in γ-butyro lactone | 70 | 1.6 (20° C.) | |
| Comp. Ex. 5 (FAOE09) | 0 | 100 | 0 | 9 | $LiPF_6$ in γ-butyro lactone | 70 | 2.0 (20° C.) | |
| 6 (FA20E09) | 22 | 78 | 0 | 9 | $LiPF_6$ in γ-butyro lactone | 70 | 2.4 (20° C.) | |
| 7 (FA40E09) | 40 | 60 | 0 | 9 | $LiPF_6$ in γ-butyro lactone | 70 | 2.6 (20° C.) | |
| 8 (FA60E09) | 62 | 38 | 0 | 9 | $LiPF_6$ in γ-butyro lactone | 70 | 2.8 (20° C.) | |

TABLE 2

| Ex | Polymer Electrolyte solution | | % by weight of electrolyte solution | Conductivity mS/cm | Conductivity mS/cm |
|---|---|---|---|---|---|
| Comp. Ex 1 | PMMA | The same as in Ex. 1 | 70 | 1.2 (20° C.) | 1.7 (30° C.) |
| Comp Ex 2 | PMMA | The same as in Ex. 2 | 70 | 1.3 (20° C.) | 0.3 (−20° C.) |

As can be seen from the Examples, the ionic conductivity is very good with the polymer gel according to the invention. In Example 1 and 2, the result is better than the comparative Examples.

Example 4

In an anhydrous mixture of γ-butyro lactone was LiPF$_6$ dissolved to give a solution containing 1.0 mole per liter. In this electrolyte solution the amphiphilic graft copolymer was dissolved in an amount of 30 percent by weight to give a homogenous polymer gel electrolyte. The gel electrolyte was introduced into the ionic conductivity-measuring cell. The ionic conductivity of the sample was measured to 4.0 mS/cm at 20° C. and 1.1 mS/cm at −20° C.

When calculating the total weight percent of poly(ethylene)oxide in the copolymer, it is 19 weight percent.

Comparative Example 4

The graft copolymer was prepared in the same way as in Example 4, but the composition was different consisting of 39 percent by weight of diethylene glycol monomethyl ether methacrylate, and 61 percent by weight of 1H,1H,7H-dodecafluoroheptyl methacrylate, ie y=39, v=0 and z=61, and n =2. When calculating the total weight percent of poly(ethylene)oxide in the copolymer, it is 18 weight percent.

In an anhydrous mixture of γ-butyro lactone was LiPF$_6$ dissolved to give a solution containing 1.0 mole per liter. In this electrolyte solution the amphiphilic graft copolymer was dissolved in an amount of 30 percent by weight to give a homogenous polymer gel electrolyte. The gel electrolyte was introduced into the ionic conductivity-measuring cell. The ionic conductivity of the sample was measured to 1.6 mS/cm at 20° C.

When comparing the copolymers used in Example 4 and Comparative Example 4, it can be seen that the copolymer in Comparative Example 4 has a structure which falls within the invention except for that n=2. According to the invention n=5 to 35. However, when comparing the total weight percent of poly(ethylene)oxide in the copolymers, it is about the same content in both the copolymers, but the ion conductivity is much higher in the copolymer where n=9. This shows the importance of the length of the hydrophilic chain.

Comparative Example 5

A graft copolymer was prepared in the same way as in Example 1, but the composition was different. In the polymer, z=0, y=100, v=0 and n=9, since z=0, no fluorinated chain is present.

In an anhydrous mixture of γ-butyro lactone was LiPF$_6$ dissolved to give a solution containing 1.0 mole per liter. In this electrolyte solution the amphiphilic graft copolymer was dissolved in an amount of 30 percent by weight to give a homogenous polymer gel electrolyte. The gel electrolyte was introduced into the ionic conductivity-measuring cell. The ionic conductivity of the sample was measured to 2.0 mS/cm at 20° C.

Example 6 to 8

Graft copolymers were prepared in the same way as in Example 1, with different compositions. Ex, 6: Z=22, Y=78, V=0, n=9. Ex. 7: Z=40, Y=60, V=0, n=9. Ex. 8: Z=62, y=38, V=0 and n=9. The results are collected in Table 1. It can be seen that the conductivity is lower in Comparative Example 5, without any fluorinated chain, compared to Examples 6 to 8 and Example 4. It is also shown that the conductivity is increasing with an increasing amount of fluor in the chain.

Example 10 11. and Comparative Example 9

In an anhydrous mixture of γ-butyro lactone was LiPF$_6$ dissolved to give a solution containing 27 oxygen per lithium (O/Li). The concentration 27 O/Li was calculated by using the total amount of oxygen in both the γ-butyro lactone and ethylene oxide side chains. In this electrolyte solution ate graft copolymers, with die composition described in Table 3, were dissolved in an amount of 50 percent by weight to give a homogenous polymer gel electrolyte. The ion conductivities were measured as described earlier, and the results are shown in Table 3.

TABLE 3

| Ex. | Z | Y | V | n | Electrolyte solution | Conductivity mS/cm |
|---|---|---|---|---|---|---|
| Comp. Ex. 9 | 0 | 100 | 0 | 9 | LiPF$_6$ in 8-butyro lactone | 0.5 (20° C.) |
| 10 | 65 | 35 | 0 | 23 | LiPF$_6$ in 8-butyro lactone | 1.1 (20° C.) |
| 11 | 76 | 24 | 0 | 9 | LiPF$_6$ in 8-butyro lactone | 1.2 (20° C.) |

It can be seen in Table 3 that the results are better for the polymer containing fluor in Example 10 and 11 than for the polymer in comparative Example 9 without fluor.

In Example 10 and 11, a conductivity of 1.1 and 1.2 and 1.1 mS/cm is obtained at 20° C. This is compared to Comparative Examples 1 and 2 with the polymer PMMA, which show conductivity of 1.2 and 1.5 mS/cm at 20° C. However, this is the conductivity for a composition including 70% by weight electrolyte solution. These results show that a similar conductivity can be obtained with the polymer according to the invention with less solvent than when using PMMA. This is very promising, since in some applications, it is an advantage to include lower amount of volatile solvents. By incorporating less volatile solvents in the polymer gel electrolyte, and at the sane time reaching sufficient ion conductivity level for operation, the safety risk factor for the battery may be reduced, which introduces an improved flexibility when designing the complete electronic unit/system.

It is shown by Examples 10 and 11, that a polymer electrolyte could be used with a reduced amount of solvent, with conductivity which is similar with electrolytes of PMMA with a higher amount of solvent.

Example 12

The graft copolymers were synthesized by radical polymerisation techniques using a macromonomer together with comonomers. The graft copolymers were synthesized using Azobisisobutyronitrile (AIBN) as a radical initiator. To a three-necked flask, equipped with a stirrer, 6.5 g of poly(ethylene glycol) (Mn=400) monomethyl ether methacrylate, and 4.3 g of 1-Hexadecyl methacrylate were added to 100 ml of toluene. After the reaction mixture had been subjected to $N_2$ to ensure oxygen free environment, 0.13 g of AIBN was added to the three-necked flask. The radical copolymerisations were carried out at a temperature of 60° C. under $N_2$ for a time of around 15 h After the synthesis the reaction mixture was filtrated to remove gel particles before removing residual monomers. The graft copolymers were first precipitated in n-hexane to remove the hydrocarbon monomer, and after drying, the precipitates were dissolved in tetrahydrofuran (THF). The second precipitation was carried out in methanol, and after drying, the precipitates were successively leached with distilled water to remove PEO macromonomers. Finally, the purity of the graft copolymers was checked with GPC by following the disappearance of PEO macromonomers.

From NMR analysis it was shown that the synthesized amphiphilic graft copolymer, used in the example 12, consisted of 62 percent by weight of poly(ethylene glycol) (Mn=400) monomethyl ether methacrylate, and 38 percent is by weight of 1-Hexadecyl methacrylate. That is y=62, v=0 and z=38, and n=9, R1=—$CH_3$ and R2=$(CH_2)_{16}H$.

Example 13

In an anhydrous mixture of γ-butyro lactone was $LiPF_6$ dissolved to give a solution containing 1.0 mole per liter. In this electrolyte solution the amphiphilic graft copolymer from Example 12 was dissolved in an amount of 30 percent by weight to give a homogenous polymer gel electrolyte. The gel electrolyte was introduced into the ionic conductivity-measuring cell, The ionic conductivity of the sample was measured to 2.4 mS/cm at 20° C.

When calculating the total weight percent of poly(ethylene)oxide in the copolymer, it is 48 weight percent.

It is shown by Example 13 that a polymer electrolyte comprising a polymer wherein the hydrophobic graft is an alkyl having 16 carbon atoms shows good conductivity.

The polymer electrolyte according to the invention has a very good ionic conductivity, due to the improved salt dissociation and lithium ion transport number, and the stability of the polymer is very good. In addition, the morphology of the polymer electrolyte gives an improved compatibility towards the electrodes resulting in reduced passivation phenomena at the electrode surfaces. When the polymer electrolyte is used in a battery, the stability will give a longer battery life and a good conductivity, which is good for the capacity of the battery.

What is claimed is:

1. A polymer electrolyte comprising a polymer, a metal salt, and optionally at least one plasticizer or solvent, characterized in that the polymer is an amphiphilic graft copolymer comprising a backbone carrying hydrophilic and hydrophobic grafts attached to different carbon atoms in the backbone, wherein the polymer has the following structure:

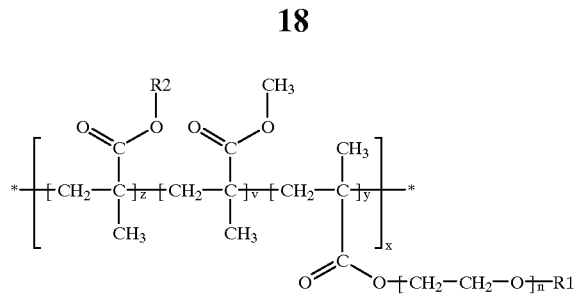

wherein:
z, y and v refer to the composition given as weight percent of the total weight of the polymer, the value of z may vary from 5 to 90 weight percent, y is in the range of 5 to 95 weight percent, and v is in the range of 0 to 90 weight percent;
n is an integer with a value in the range of 5 to 35, and R1 is selected from the group consisting of an alkyl group, preferably C1–5 alkyl.
R2 is selected from the group consisting of a fluorinated C1–20 alkyl.

2. A polymer electrolyte according to claim 1, characterized in that the value of z may vary from 10 to 80 weight percent, y is in the range of 10 to 90 weight percent, v is in the range of 0 to 50 weight percent and R2 is selected from the group consisting of a fluorinated $C_{1-10}$ alkyl.

3. A polymer electrolyte according to claim 1, characterized in that the metal salt is a lithium salt.

4. A polymer electrolyte according to claim 3, characterized in that said lithium salt is selected from a group consisting of $LiPF_6$, $LiAsF_6$, $LiBF_4$, $LiClO_4$, $LiN(CF_3SO_2)_2$, and lithium salts of the perfluoro-sulfonate family such as $LiSO_3CF_3$, $LiSO_3(CF_2)_3CF_3$ and $LiSO_3(CF_2)_9CH_3$.

5. A polymer electrolyte according to claim 4, characterized in that the electrolyte is crosslinked.

6. A polymer electrolyte according to claim 1, characterized in that the electrolyte is a polymer gel electrolyte and does contain at least one plasticizer or solvent.

7. A polymer electrolyte according to claim 1, characterized in that the electrolyte is a solid polymer electrolyte and does riot contain any plasticizer or solvent.

8. A polymer battery cell comprising a cathode, an anode, and a polymer electrolyte comprising a metal salt, a polymer and optionally at least one plasticizer or solvent, characterized in that the polymer is an amphiphilic graft copolymer comprising a backbone carrying hydrophilic and hydrophobic grafts attached to different carbon atoms in the backbone, wherein the polymer has the following structure:

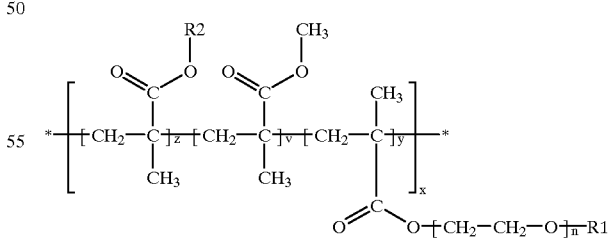

wherein:
z, y and v refer to the composition given as weight percent of the total weight of the polymer, the value of z may vary from 5 to 90 weight percent, y is in the range of 5 to 95 weight percent, and v is in the range of 0 to 90 weight percent;
n is an integer with a value in the range of 5 to 35, R1 is selected from the group consisting of an alkyl group, preferably $C_{1-5}$ alkyl, and, R2 is selected from the group consisting of a fluorinated $C_{1-20}$ alkyl.

9. A polymer battery cell according to claim 8, characterized in that the value of z may vary from 10 to 80 weight percent, y is in the range of 10 to 90 weight percent, v is in the range of 0 to 50 weight percent and R2 is selected from the group consisting of a fluorinated $C_{1-10}$ alkyl.

10. A polymer battery cell according to claim 8, characterized in that the metal salt is a lithium salt.

11. A polymer battery cell according to claim 10, characterized in that said lithium salt is selected from a group consisting of $LiPF_6$, $LiAsF_6$, $LiBF_4$, $LiClO_4$, $LiN(CF_3SO_2)_2$, and lithium salts of the perfluoro-sulfonate family such as $LiSO_3CF_3$, $LiSO_3(CF_2)_3CF_3$ and $LiSO_3(CF_2)_9CH_3$.

12. A polymer battery cell according to claim 11, characterized in that the electrolyte is crosslinked.

13. A polymer battery cell according to claim 8, characterized in that the electrolyte is a polymer gel electrolyte and does contain at least one plasticizer or solvent.

14. A polymer battery cell according to claim 8, characterized in that the electrolyte is a solid polymer electrolyte and does not contain any plasticizer or solvent.

* * * * *